(12) United States Patent
Gong et al.

(10) Patent No.: US 10,990,367 B2
(45) Date of Patent: Apr. 27, 2021

(54) APPLICATION DEVELOPMENT METHOD, TOOL, AND DEVICE, AND STORAGE MEDIUM

(71) Applicant: Tencent Technology (Shenzhen) Company Limited, Shenzhen (CN)

(72) Inventors: Cheng Gong, Shenzhen (CN); Yuanhong Liu, Shenzhen (CN); Ji Zhang, Shenzhen (CN); Yuanming Li, Shenzhen (CN); Yu Zhong, Shenzhen (CN); Jiangwei Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 172 days.

(21) Appl. No.: 16/449,206

(22) Filed: Jun. 21, 2019

(65) Prior Publication Data
US 2019/0310835 A1    Oct. 10, 2019

Related U.S. Application Data

(63) Continuation of application No. PCT/CN2018/080564, filed on Mar. 26, 2018.

(30) Foreign Application Priority Data

Mar. 28, 2017    (CN) .......................... 201710193344.2

(51) Int. Cl.
*G06F 9/44* (2018.01)
*G06F 8/53* (2018.01)
(Continued)

(52) U.S. Cl.
CPC .................. *G06F 8/53* (2013.01); *G06F 8/22* (2013.01); *G06F 8/36* (2013.01); *G06F 8/41* (2013.01)

(58) Field of Classification Search
CPC ..... G06F 8/53; G06F 8/22; G06F 8/36; G06F 8/41
See application file for complete search history.

(56) References Cited

U.S. PATENT DOCUMENTS

2006/0101385 A1    5/2006   Gerken et al.

FOREIGN PATENT DOCUMENTS

| CN | 104142830 A | 11/2014 |
| CN | 104714830 A | 6/2015 |

(Continued)

OTHER PUBLICATIONS

Tencent Technology, ISR, PCT/CN2018/080564, Jun. 6, 2018, 2 pgs.

(Continued)

*Primary Examiner* — Chuck O Kendall
(74) *Attorney, Agent, or Firm* — Morgan, Lewis & Bockius LLP

(57) ABSTRACT

Embodiments of the present application disclose an application development method performed at a computing device. The method includes: obtaining an input file in a predetermined format, the input file including content code of each part used for forming an application; disassembling the content code of each part in the input file into different category code according to corresponding categories; invoking a corresponding compiler according to an attribute of each piece of the category code, to compile the category code, to correspondingly obtain a description file of each piece of the category code; and performing plug-in processing on the description file of the category code of each part, to obtain the application.

18 Claims, 10 Drawing Sheets

(51) Int. Cl.
  *G06F 8/36*   (2018.01)
  *G06F 8/41*   (2018.01)
  *G06F 8/20*   (2018.01)

(56) References Cited

FOREIGN PATENT DOCUMENTS

| | | |
|---|---|---|
| CN | 106371829 A | 2/2017 |
| CN | 106980504 A | 7/2017 |

OTHER PUBLICATIONS

Tencent Technology, WO, PCT/CN2018/080564, Jun. 6, 2018, 5 pgs.
Tencent Technology, IPRP, PCT/CN2018/080564, Oct. 1, 2019, 6 pgs.

```
▼ 🗁 src                          ▼ 🗁 src
  ▶🗁 common                        ▼ 🗁 components
  ▼ 🗁 components                      ◻action.wpy
      ◻ coupon.wxml                    ◻nput.wpy
      ◻ input.wxml                     ◻input_history.wpy
      ◻ mobile.wxml                    ◻mobile.wpy
      ◻ traffic.wxml                   ◻traffic.wpy
      ◻ traffic_package.wxml      ▶🗁 images
  ▶🗁 css                          ▼ 🗁 pages
  ▶🗁 images                          ◻detail.wpy
  ▼ 🗁 less                           ▣list.css
  ▼ 🗁 pages                          ◻list.wpy
      ◻ common.wxss                   ◻success.wpy
      ▣ detail.js                  ◻app.less
      ◻ detail.less                ◻app.wpy
      ◻ detail.wxml
      ◻ detail.wxss
      ▣ list.js
      ◻ list.less
      ◻ list.wxml
      ◻ list.wxss
      ▣ successes.js
      ◻ success.less
      ◻ success.wxml
      ◻ success.wxss
  ▣ app-config.json
  ▣ app.css
  ▣ app.js
  ▣ app.json
  ◻ app.less
  ◻ app.wxss
  ◻ app.wxml
```

FIG. 3

APPLICATION DEVELOPMENT METHOD, TOOL, AND DEVICE, AND STORAGE MEDIUM

CROSS-REFERENCE TO RELATED APPLICATIONS

This application is a continuation application of PCT/CN2018/080564, entitled "APPLICATION DEVELOPMENT METHOD, TOOL, AND DEVICE, AND STORAGE MEDIUM" filed on Mar. 26, 2018, which claims priority to Chinese Patent Application No. 201710193344.2, entitled "APPLICATION DEVELOPMENT METHOD, TOOL, AND DEVICE, AND STORAGE MEDIUM" filed on Mar. 28, 2017, all of which are incorporated by reference in their entirety.

FIELD OF THE TECHNOLOGY

The present disclosure relates to mobile application technologies, and in particular, to an application development method, tool, and device, and a storage medium.

BACKGROUND OF THE DISCLOSURE

With development of terminal technologies and mobile Internet technologies, more mobile applications (MAs), for example, instant messaging applications, entertainment applications, news applications, game applications, financial applications, puzzle applications, learning applications, payment applications, search applications, life convenience applications, are installed in terminals such as mobile phones or tablet computers. Generally, if a user intends to enjoy some service such as make payment to merchants, the user needs to install an application having a payment function, and then opens the application to enjoy the service. This manner needing to install an application to enjoy a service is increasingly unsuitable for life concepts of speediness, convenience, and sharing.

Currently, sharing of knowledge and information type lightweight products may provide sharing and benefits in a maximum range, but ride sharing, service sharing, and real economy sharing are limited to districts or time. For such service sharing, a virtual node needs to be found. In this case, a mini program appears. The mini program just provides a virtual node for speediness, convenience, and sharing, so that wide sharing is completed through connections to the Internet. The mini program makes the service sharing become a type of information that is extremely easy to obtain. The service and the mini program are connected, so that the mini program keeps away from the content ecology, and is connected to users to serve the users. This mode may become a light online to offline (O2O) service, avoiding bloated main programs such as WeiXin, and implementing service sharing.

The mini program is an application that may be used without the need of being downloaded and installed, and implements dreams of "accessible" applications. The users can open applications by scanning or searching. Because the mini program itself does not need to be installed and uninstalled, the mini program also embodies the "Drop after Use" concept, and the users do not need to care about the problem that whether excessive applications are installed. The appearance of the mini program makes applications everywhere, and available at any time without the need of installing and uninstalling any application.

Based on the advantages of the foregoing mini program, the mini program has become popular, but the development of the mini program is still at the stage that files (such as a JavaScript (js) file and a JavaScript Object Notation (json) file) needed for the mini program are manually written. Therefore, the development of the mini program is very time-consuming and effort-consuming.

SUMMARY

In view of this, embodiments of the present application provide an application (for example, mini program) development method, tool, and device, and a storage medium, to resolve at least one problem in the existing technology.

The technical solutions of the embodiments of the present application are implemented as follows:

According to a first aspect of the present application, the embodiments of the present application provide an application development method performed at a computing device having one or more processors and memory storing a plurality of operations to be executed by the one or more processors, the method comprising:

obtaining an input file in a predetermined format, the input file including content code of each part used for forming an application;

disassembling the content code of each part in the input file into different category code according to corresponding preset categories;

invoking a corresponding compiler according to an attribute of each piece of the category code, to compile the category code, to correspondingly obtain a description file of each piece of the category code; and performing plug-in processing on the description file of the category code of each part, to obtain the application.

According to a second aspect of the present application, the embodiments of the present application provide a computing device having one or more processors, memory coupled to the one or more processors, and a plurality of program modules stored in the memory. The program modules, when executed by the one or more processors, cause the computing device to perform the aforementioned application development method.

According to a third aspect of the present application, the embodiments of the present application provide a non-transitory computer readable storage medium storing a plurality of machine readable instructions in connection with a computing device having one or more processors. The program modules, when executed by the one or more processors, cause the computing device to perform the aforementioned application development method.

The embodiments of the present application provide an application development method, tool, and device, and a storage medium. An input file in a predetermined format is obtained, the input file including content code of each part used for forming an application; the content code of each part in the input file is disassembled into different category code according to corresponding preset categories; a corresponding compiler is invoked according to an attribute of each piece of the category code, to compile the category code, to correspondingly obtain a description file of each piece of the category code; and plug-in processing is performed on the description file of the category code of each part, to obtain the application. In this way, the time-consuming and effort-consuming problem of the current application development can be resolved, thereby developing applications rapidly and conveniently.

BRIEF DESCRIPTION OF THE DRAWINGS

FIG. 3 is a schematic diagram of a comparison result between a file directory structure and an existing directory structure according to an embodiment of the present application.

DESCRIPTION OF EMBODIMENTS

Figure 1:
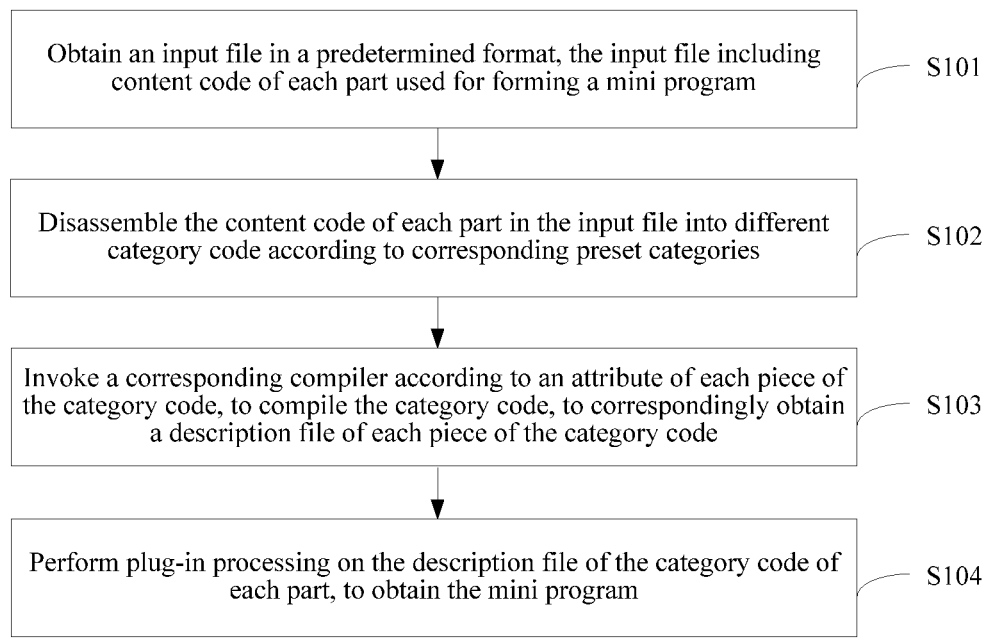
FIG. 1 is a schematic flowchart of an implementation of an application development method according to an embodiment of the present application.

A mini program, for example, a WeiXin mini program, is an application that may be used without the need of being downloaded and installed, and it implements the dream of "accessible" applications. Users can open applications by scanning or searching. Currently, during development of a mini program, the users may encounter the following problems:

1) Currently, there is no concept of componentization in the mini program, and only pseudo componentization can be implemented by modularization and templates. The defect of the pseudo componentization lies in high reuse costs, and there is no isolation between pseudo components. Because there is no isolation between the components, during modification of a component, other components having a dependency relationship (an association relationship) may be unavailable. The embodiments of the present application provide a mini program development method or tool based on isolated components.

2) Currently, during development of a mini program, massive external resources, for example, third-party node package manager (NPM) resources, cannot be automatically used because generally, the NPM resources are developed for conventional web pages, but the mini program is different from the conventional web pages. Therefore, the NPM resources cannot be directly used. If a developer intends to use the NPM resources, the developer can only use code on an NPM in a manual download manner and a manual copy manner. For NPM resources with complex dependencies, the manual download manner and the manual copy manner are helpless. In the embodiments of the present application, the dependency relationship (an association relationship embodied by association information) between the NPM resources is automatically processed, and then in a compiling process, the dependency relationship between the resources is automatically processed and files are copied, thereby resolving the problem that the third-party NPM resources cannot be introduced to the current mini program development process.

3) Content of each part of a mini program includes several files. For example, an application part corresponds to three files, and a page part corresponds to four files. The page part in the mini program generally includes a plurality of pages. For example, a mini program includes five pages, and each page corresponds to four files, so that a page part in a development directory includes 20 files. Therefore, excessive files may cause a confused code directory structure. In the embodiments, through a component mode, each page corresponds to only one file in a predetermined format, so that in effect, four files originally on each page are packaged, and the problem of the confused code directory structure can be avoided. In addition, unlike the conventional web development, no new characteristics or specifications can be introduced to the mini program development. This solution can resolve the problem through compiling.

To better understand the following embodiments of the present application, some terms are explained as follows:

Web: an integration of protocols and standards for accessing information resources on the Internet. That is, web is a service provided on the Internet.

Module: during web development, logical code is packaged into independent sets.

Component: during web development, page element styles of a Hyper Text Markup Language (HTML) such as an HTML 4 and an HTML 5 and logic are packaged into an independent set.

NPM resource: a module resource developed and shared by other people. An NPM is usually referred to as a node package manager, and obviously, the main function of the NPM is managing node packages, where the managing includes: installing, uninstalling, updating, viewing, searching, releasing, and the like.

Application part of a mini program and page part of the mini program: The mini program generally at least includes an application part and a page part. The application part may generally include two or three files. The two files are app.json and app.js, and the three files are respectively app.json, app.js, and app.wxss. The page part generally includes three or four files. The three files are index.json, index.js and index.wxss, and the four files are respectively index.json, index.js, index.wxml and index.wxss. It should be noted that json may be nested in .js. That is, during classification, .json may not be independently split out, but is classified into .js. In this way, the three files split by the application part are two files: app.js and app.wxss, and the three or four files split by the page part are correspondingly two or three types respectively. .js represents logical code, .json represents configuration code, and json uses a text format completely independent from languages, but also uses habits similar with C language families (including C, C++, C#, Java, JavaScript, Perl, Python, and the like).

.wxss represents style sheet code, where wxss represents a WeiXin style sheet. wxss is a set of style languages, used for describing a component style of a WeiXin markup language. That is, wxss is used to determine how to display components of wxml. To adapt to vast front-end developers, wxss has most characteristics of a cascading style sheet, and to more adapt to development of the WeiXin mini program, wxss expands and modifies the CSS. For example, compared with the CSS, for wxss, expanded characteristics have size units and style imports.

The CSS is a computer language used for representing a file style such as an application of a standard generalized markup language or a subset of a standard generalized markup language of an eXtensible Markup Language (XML). The CSS not only can statically decorate a web page, but also can dynamically format elements of the web page with various JavaScripts. The CSS can perform pixel-level precise control on the layout of element positions in the web page, support almost all font size styles, and have a capability of editing a web page object and a model style. For example, the CSS may extend a display function of the HTML, and may set the color, font, size, width, margin, and alignment of words of an original HTML file. The CSS can easily and effectively perform more precise control on the overall layout, font, color, link, and background of the page.

.wxml represents structure code, wxml is short for the WeiXin Markup Language, and wxml is a set of label languages designed based on a network application (Apache MINA) framework. In combination with a basic component and an event system, a structure of the page may be constructed.

Based on the foregoing concepts, in the embodiments of the present application, an input file is disassembled into a style, a page element, a logical function, and a configuration, and then components are split, in a compiling manner, into wxml, wxss, js, and json files needed by a mini program, and the component is automatically identified in a compiling process to complete isolation work between the components.

The following further describes the technical solutions of the present disclosure with reference to the accompanying drawings and specific embodiments.

The embodiments of the present application provide an application development method, applied to a computing device. Functions implemented by the application development method may be implemented by invoking program code by a processor in the computing device. Certainly, the program code may be stored in a computer storage medium. As can be seen, the computing device at least includes a processor and a storage medium.

FIG. 1 is a schematic flowchart of an implementation of an application development method according to an embodiment of the present application. As shown in FIG. 1, the method includes:

Step S101. Obtain an input file in a predetermined format, the input file including content code of each part used for forming a mini program.

In this embodiment, the mini program may be a child application applied on a parent application. For example, for a mini program loaded on an instant chatting application, the instant chatting application may be understood as a parent application, and the mini program is a child application.

In this embodiment, the input file may be code manually written by a user, or may be code automatically generated. The manually written code includes code written by a user line by line, and further includes code on an NPM that is obtained by the user from third-party external resources such as NPM resources in a manual download manner and a manual copy manner.

In this embodiment, the predetermined format may be a format set by a person skilled in the art, for example, a de format, a wpy format, or another format. It should be noted that, because the input file needs to be disassembled into a file type corresponding to content code of each part of the mini program. Therefore, during setting of the format, disassembling convenience and difficulty further need to be considered. As a preset format that reduces the disassembling difficulty and provides convenience, the wpy format may be used, that is, the input file is in the wpy format.

In this embodiment, the mini program at least includes an application part and a page part, so that the input file at least includes content code of the application part of and content code of the page part.

Step S102. Disassemble the content code of each part in the input file into different category code according to corresponding preset categories.

In this embodiment, as described above, each part of the mini program corresponds to several files. For example, the application part includes three files, and the three files are respectively app.json, app.js, and app.wxss; and the page part generally includes four files, and the four files are respectively index.json, index.js, index.wxml, and index.wxss. Therefore, in step S102, the application part of the mini program needs to be disassembled into three different types of category code. That is, the three types of category code may respectively correspond to app.json, app.js, and app.wxss. The page part needs to be disassembled into four different types of category code. That is, the four types of category code may respectively correspond to index.json, index.js, index.wxml, and index.wxss.

Step S103. Invoke a corresponding compiler according to an attribute of each piece of the category code, to compile the category code, to correspondingly obtain a description file of each piece of the category code.

In this embodiment, corresponding compilers are invoked for different category code to compile the category code, and a description file of the category code is then obtained. For example, compilers respectively corresponding to the four types of category code are a first, second, and third compiler set. Therefore, during compiling of category code.json, compilers in the first compiler set may be used to compile category code.json, to obtain description file.json of the mini program.

Step S104. Perform plug-in processing on the description file of the category code of each part, to obtain the mini program.

In this embodiment, the effect of the plug-in processing is that content of the file is processed. Therefore, the content changes, but a quantity of the files and a suffix and format of the file do not change. The plug-in processing generally includes file compression, replacement of variables in the code, content obfuscation, picture compression, change of picture resolution, change of a picture size, and the like.

In another embodiment of the present application, the input file at least includes content code of an application part and content code of a page part, and in step S102, the disassembling the content code of each part in the input file into different category code according to corresponding preset categories includes:

for the content code of the application part, at least disassembling the content code of the application part into script code; and for the content code of the page part, at least disassembling content code of each page in the page part into style code, page element code, and script code.

In this embodiment of the present application, to reduce disassembling difficulty, during disassembling, multi-level disassembling is used. During first-level disassembling, configuration code and logical code are first disassembled as a whole, and then during second-level disassembling, the logical code and the configuration code are disassembled apart. That is, in the first-level disassembling, the configuration code may not be split out independently, but is classified into the logical code. In this way, in the simplest disassembling process, the application part is only disassembled into the logical code, namely, only corresponds to one description file (.js), and the page part may be disassembled into the style code, the page element code, and the script code, namely, correspond to three description files: .js, .wxml and .wxss.

In another embodiment of the present application, the invoking a corresponding compiler according to an attribute of each piece of the category code, to compile the category code, to correspondingly generate a description file of each piece of the category code includes: invoking compilers respectively corresponding to the style code, the page element code, the logical code, and the configuration code, to correspondingly compile the style code, the page element code, the logical code, and the configuration code of each page respectively, to correspondingly obtain a style sheet file, a page structure file, a logical file, and a configuration file of each page respectively.

For example, compilers in a preset first compiler set are invoked to compile the style code, to generate a description file of a style sheet; compilers in a preset second compiler set are invoked to compile the page element code, to generate a description file of a page structure; and compilers in a preset third compiler set are invoked to compile the logical code, to generate a logical description file. The first compiler set includes compilers such as css, less, sass, and stylus, the second compiler set includes compilers such as wxml and pug, and the third compiler set includes compilers such as babel and typescript. Generally, because the configuration code does not need to be compiled, no corresponding compiler is needed.

To resolve the current problem that during development of a mini program, massive external resources, for example, third-party NPM resources, cannot be automatically used because generally, the NPM resources are developed for conventional web pages, but the mini program is different from the conventional web pages. Therefore, the NPM resources cannot be directly used. If a developer intends to use the NPM resources, the developer can only use code on an NPM in a manual download manner and a manual copy manner. For NPM resources with complex dependencies, the manual download manner and the manual copy manner are helpless. In this embodiment of the present application, improvement is made from two aspects: In the first aspect, the content code is automatically obtained from external resources, and in the second aspect, the dependency relationship (an association relationship embodied by association information) between the NPM resources is automatically processed, and then in a compiling process, the dependency relationship between the resources is automatically processed and files are copied, thereby resolving the problem that the third-party NPM resources cannot be introduced to the current mini program development process.

According to the first aspect, in another embodiment of the present application, in step S101, the obtaining an input file in a predetermined format includes:

Step S111. Retrieve content code from a resource library according to a determined keyword, and at least load the retrieved content code.

In this embodiment, the keyword is used for retrieving the content code in the input file. For example, the keyword may be content code implementing an album function, invoking a global positioning system (GPS), invoking a payment application, opening a camera, opening code scanning, and the like. If a user enters a keyword, the computing device may retrieve content code corresponding to the function from the resource library, then requests the content code from a remote server of the resource library or requests the content code from a local database of the resource library, and then loads the retrieved content code.

In this embodiment, the resource library may be NPM resources, or resources in the local database.

Step S112. Perform format conversion on the content code according to a preset format, to obtain the input file in the predetermined format.

According to the second aspect, in another embodiment of the present application, the method further includes:

Step S201. Analyze the content code of each part in the input file, to obtain association information between modules in each part.

Step S202. Determine path information of the modules in each part.

In this embodiment, path information of a module generally refers to a local storage path.

Step S203. Modify path information in the input file according to the association information between the modules in each part and the path information of the modules in each part.

Step S204. Disassemble content code of each part in the modified input file into different category code according to the corresponding preset categories.

Currently, the mini program can implement only pseudo componentization by modularization and templates. The defect of the pseudo componentization lies in high reuse costs, and there is no isolation between pseudo components. Because there is no isolation between the components, during modification of a component, other components having a dependency relationship (an association relationship) may be unavailable. In this embodiment of the present application, to resolve the current problem that there is no concept of componentization in the mini program, this embodiment of the present application provides a mini program development method or tool based on isolated components. That is, the resource library in this embodiment includes three types of base class resources: base class components, base class pages, and base class applications. The base class components are isolated from each other, and the base class pages inherit from the components. Correspondingly, in step S111, the retrieving content code from a resource library according to a determined keyword, and at least loading the retrieved content code includes: retrieving a base class component, a base class page, and a base class application from the resource library according to the determined keyword; and at least loading the retrieved base class component, base class page, and base class application.

Step S112. The performing format conversion on the content code according to a preset format, to obtain the input file in the predetermined format includes: recombining the retrieved base class component into a user-defined component, recombining the retrieved base class page and a user component into a user-defined page, and recombining the retrieved base class application and the user-defined page into a user-defined application; and performing format conversion respectively on the user-defined component, the user-defined page, and the user-defined application according to the preset format, to obtain the input file in the predetermined format.

Figure 2:
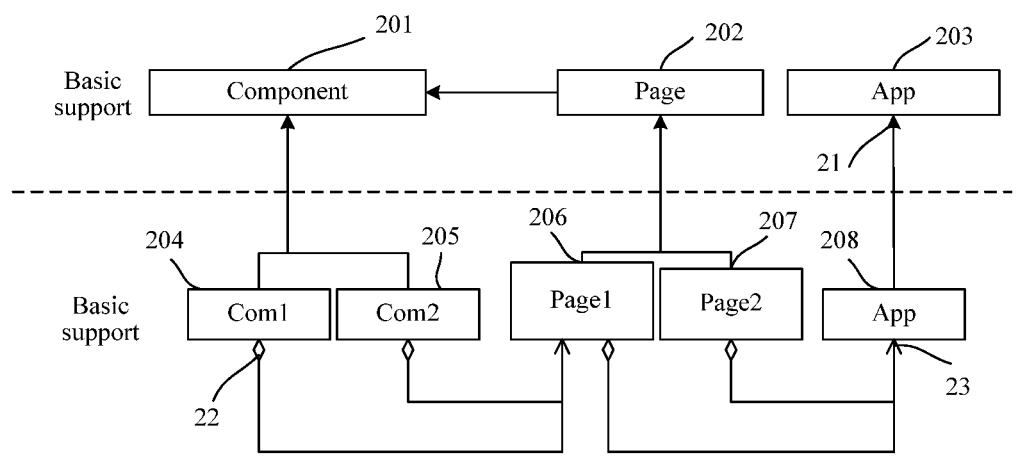
FIG. 2 is a relationship diagram of base classes according to an embodiment of the present application.

FIG. 2 is a relationship diagram of base classes according to an embodiment of the present application. As shown in FIG. 2, this embodiment of the present application provides three basic supported base classes, which are respectively a component base class, a page base class, and an app base class. Being based on a page is also the principle of the component, and therefore, the page base class also inherits from the component base class. In FIG. 2, a solid small triangular arrow 21 represents an inheritance relationship, a hollow rhombus 22 represents a formation relationship, and a linear arrow 23 represents an inclusion relationship. User-defined components and pages both inherit from the base classes. For example, a user-defined App 208 inherits from a base class app 203, including two pages: a Page1 206 and a Page2 207, inheriting from a page 202. The Page1 206 further includes two components: a Com1 204 and a Com2 205, inheriting from a component 201. It should be noted that, because the base class components are isolated from each other, when the mini program completed based on the foregoing base classes perform communication and binding functions between components, the mini program is also different from a common mini program. The communication and binding functions between the components are described in the following embodiment.

Content of each part of a mini program includes several files. For example, an application part corresponds to three files, and a page part corresponds to four files. The page part in the mini program generally includes a plurality of pages. Therefore, excessive files may cause a confused code directory structure. To resolve the current problem of the confused mini program directory structure, in this embodiment, through a component mode, each page only corresponds to one file in a predetermined format, so that in effect, four files originally on each page are packaged, and the problem of the confused code directory structure can be avoided. In this embodiment, the method further includes:

Step S105. Content code (namely, a code file) of each page is used to form each page of the input file according to the predetermined format.

For the page part, each page of the page part is represented by using only one file in a preset format. FIG. 3 is a schematic diagram of a comparison result between a development file directory structure and an existing development directory structure according to an embodiment of the present application. As shown in FIG. 3, the left side is a directory structure after a mobile phone recharging mini program uses the existing solution, and the right side is a directory structure after a mobile phone recharging mini program uses the solution provided in this embodiment. As can be seen from the left side of FIG. 3, the page part includes three pages (success, list, and detail) in total. Each page includes four code files (.js, .less, .wxml, and .wxss). Therefore, the directory at the left side seems relatively long and confused. After the technical solutions provided in this embodiment of the present application are used, each of the three pages: success, list, and detail, is represented in a predetermined format, namely, pages: success.wpy, list.wpy, and detail.wpy are formed. In effect, the previous four code files are packaged as a whole, and the packaged files are success.wpy, list.wpy, and detail.wpy. Obviously, the technical solutions provided in this embodiment of the present application can avoid the confused code directory structure problem.

Generally, one .wpy file is divided into three parts: style code <style></style> corresponds to original wxss, template code <template></template> corresponds to original wxml, and script code <script></script> corresponds to original js and json. An entry file app.wpy does not need a template, and therefore may be ignored during compiling. The three labels all support type and src attributes, type determines a code compiling process, and src determines whether to connect to external code. When the src attribute exists and is valid, connection to internal code is ignored.

Figure 4A:
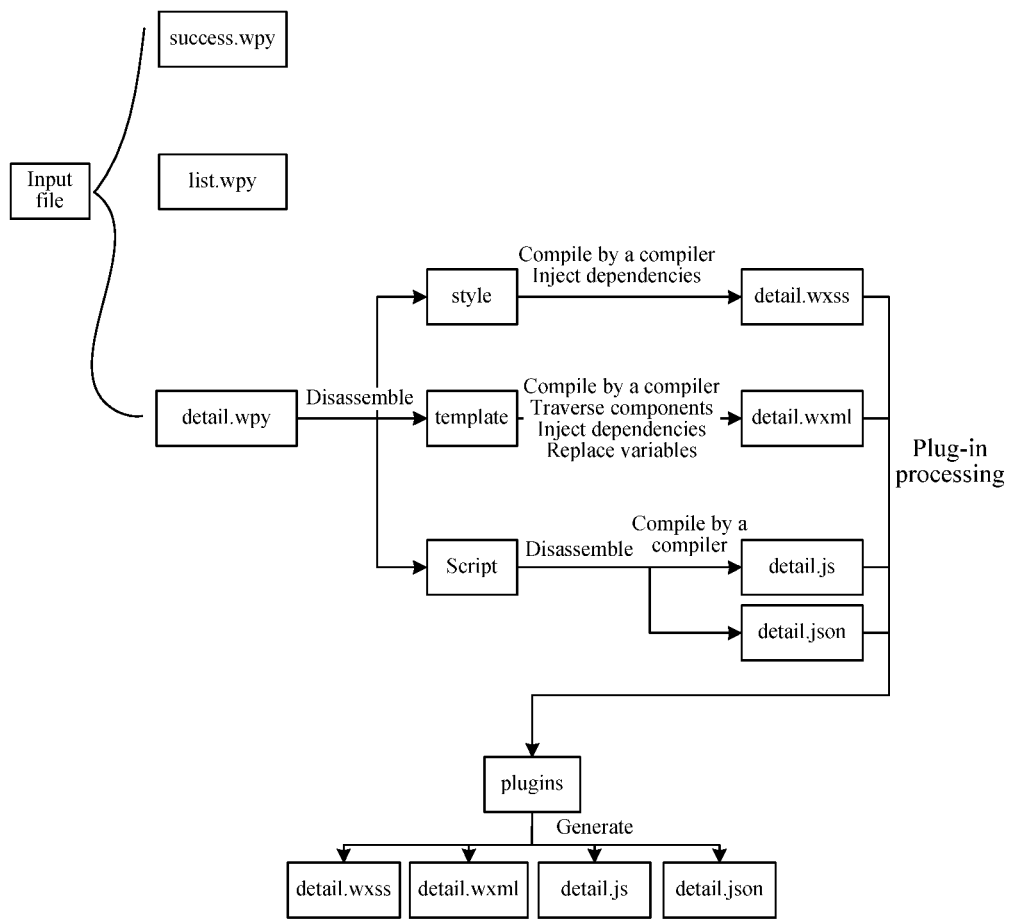
FIG. 4A is a schematic diagram of a compiling process of an input file according to an embodiment of the present application.

The following describes a compiling process of an input file in this embodiment of the present application. FIG. 4A is a schematic diagram of a compiling process of an input file according to an embodiment of the present application. As shown in FIG. 4A, the input file includes a page part and an application part (the application part is not shown), and the page part includes three pages, which are respectively success, list, and detail, and correspond to content code success.wpy, list.wpy, and detail.wpy respectively. The following uses detail.wpy as an example for description. First, detail.wpy is disassembled, and style code, page element (template) code, and script code are obtained after the disassembling. Then, the script code is further disassembled into logical code and configuration code. The style code, the page element code, and the script code are respectively processed as follows:

The style code may be compiled by using a compiler such as css, less, sass, and stylus in a configuration, and components are traversed, dependencies are injected, and variables are replaced, to finally generate a .wxss file needed by a mini program. Traversing the components is to obtain an association relationship between the components, where the association relationship is also referred to as a dependency relationship, embodied as association information. Injecting the dependencies is modifying path information between the components according to the association information between the components, namely, completing a variable replacement process of the path information.

The page element code is compiled by using compilers such as wxml and pug in the configuration, and a dependency relationship between page reference components is analyzed, to inject the dependency relationships between the components and replace variables, and then generate a .wxml file needed by the mini program.

The script code is first disassembled, to obtain logical code and configuration code, and is then compiled by using compilers such as babel and typescript in the configuration, to generate detail.js and detail.json needed by the mini program.

Plug-in processing is configured for all files to generate a final file needed by the mini program. Herein it should be noted that, the effect of the plug-in processing is that content of the program is processed. Therefore, the content changes, but the quantity of the files and the suffix and format of the file do not change. The plug-in processing generally includes file compression, replacement of variables in the code, content obfuscation, picture compression, change of picture resolution, change of the picture size, and the like.

In this embodiment of the present application, to utilize the NPM resources, in the compiling process, require in the code is traversed recursively, then a corresponding file is copied from node_modules, and require paths of the files are modified one by one, to implement support for an external NPM packet.

Figure 4B:
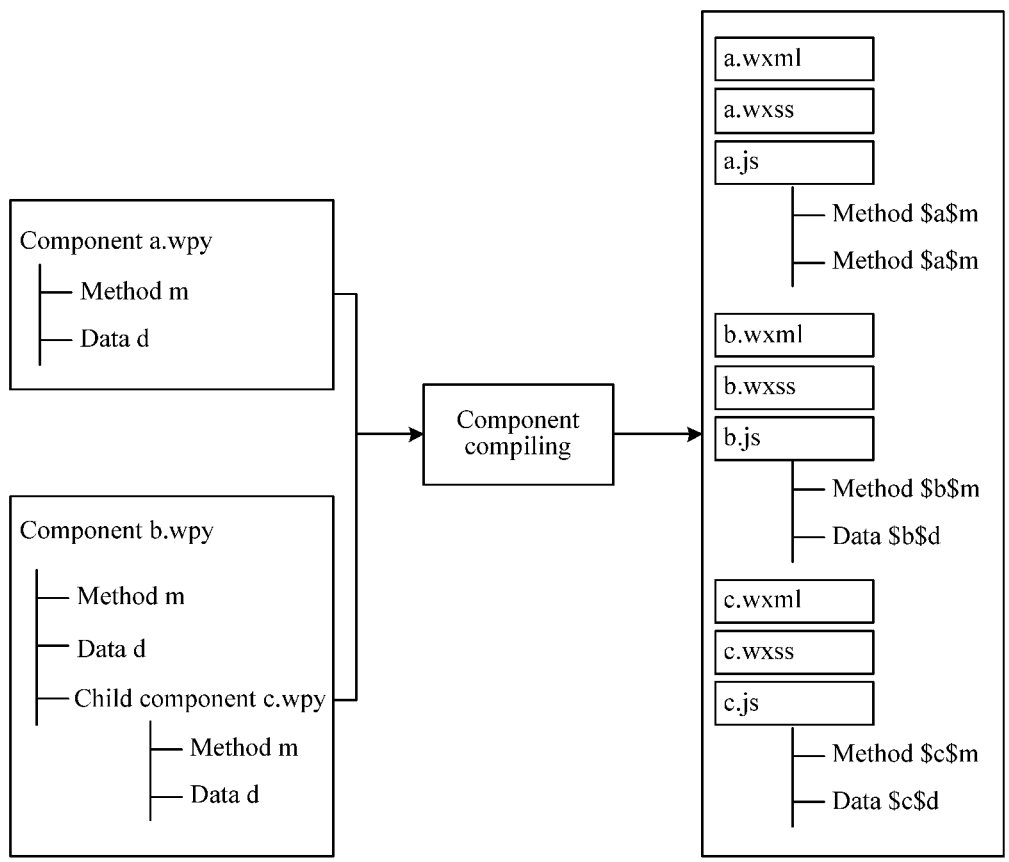
FIG. 4B is a schematic diagram of a compiling process of a component according to an embodiment of the present application.

In addition to the page part and the application part, the input file further includes a component part. A component compiling process is as follows: During generation of the final file, if there still are same named methods m, or same named data d, data coverage between the modules may be caused. Therefore, during compiling of the components, the components are searched recursively one by one, to allocate a prefix starting with a preset symbol (for example, symbols such as $ and #) to each component, and all methods and data of the components are added with component prefixes to ensure unique names of the methods or data of the components. As shown in FIG. 4B, an m method of a component a may become a $a$m method, an m method of a component b may become a $b$m method, and an m method of a child component c of the component b may become a $b$c$m method. Because the component name is unique, the methods and data in the components are independent, thereby implementing isolation between the components.

It should be noted that, in this embodiment, the component or page is suffixed by .wpy. In the compiling process, the component or the page is first disassembled into three parts: style, template, script, which are respectively responsible for three parts: style code, page element code, and logical code. The disassembled code may be in any preset format. That is, the suffixes of the style code, the page element code, and the logical code may be specified.

The following uses an album function as an example for description. An album includes an app describing an overall program and a plurality of pages describing respective pages. The program app mainly includes three files, which are respectively app.js (mini program logic), app.json (mini program setting), and app.wxss (mini program style sheet). The former two are necessary files. For the page, each page at least includes two files: .js (page logic) and .wxml (page structure), and .wxss (page style sheet) and son (page configuration) files are optional. A config.js file includes settings for some deployed domain names. A pages directory includes two pages, which are respectively index and album. The page structure is relatively simple, where index is a page entered by default when the mini program is started. Each page at least includes two files: js (page logic) and .wxml (page structure), and .wxss (page style sheet) and son (page configuration) files are optional. File names of the files are the same as names of a father directory, to reduce configuration options, and facilitating developers.

Figure 4C:
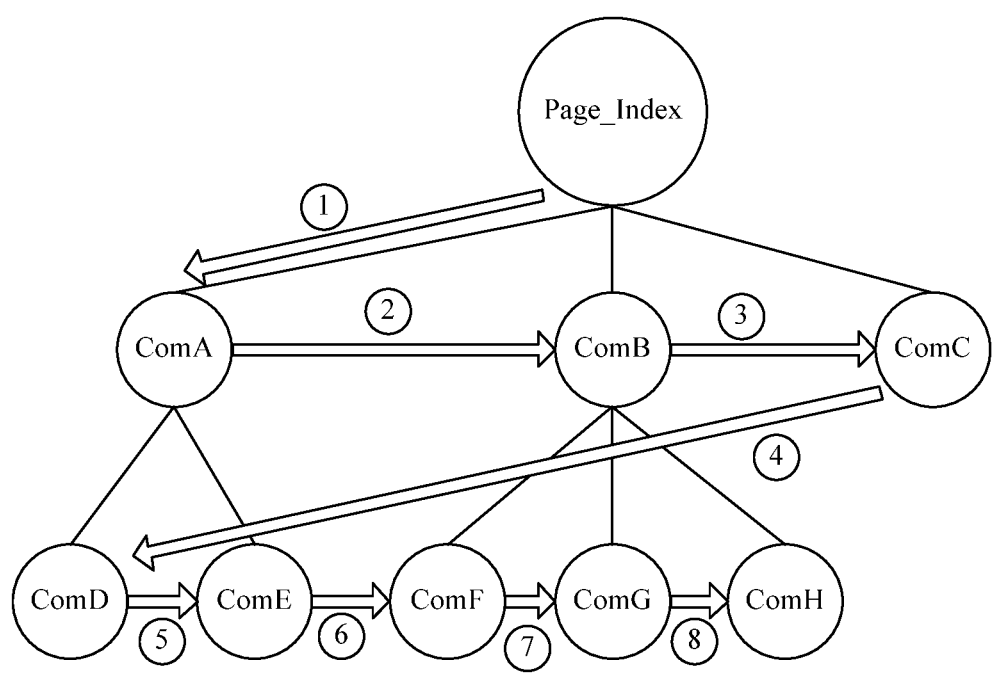
FIG. 4C is a schematic flowchart of transferring a broadcast event according to an embodiment of the present application.
Figure 4D:
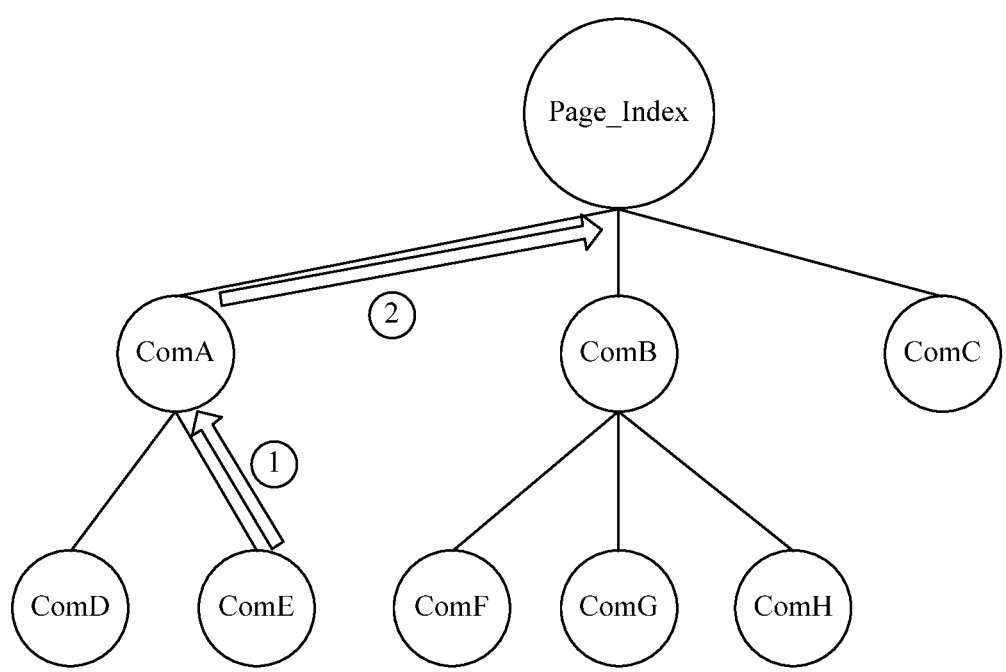
FIG. 4D is a schematic flowchart of transferring a bubbling event according to an embodiment of the present application.

As described above, in this embodiment of the present application, isolation is performed on the components, and because the components are isolated from each other, communication between the components needs the following two manners: a broadcast manner and a bubbling manner:

As shown in FIG. 4C and FIG. 4D, three components ComA, ComB, and ComC are introduced to an Index page, ComA further has child components ComD and ComE, and ComB further has child components ComF, ComG, and ComH.

$broadcast: Referring to FIG. 4C, a father component initiates a broadcast event, and all child components are then traversed by using a breadth first search algorithm. Each child component sequentially responds to the event. For example, a broadcast sequence of the Index page is ComA-→ComB→ComC→ComD→ComE→ComF→ComG-→ComH. That is, after the Index page initiates a broadcast event, components sequentially responding to the event are A, B, C, D, E, F, G, and H components.

$emit: Referring to FIG. 4D, a child component initiates a bubbling event, the event bubbles upward along a single path, and the father component sequentially receives the event. The child component E initiates a bubbling event, and procedures sequentially responding to the event are ComA and the page Index.

Figure 4E:
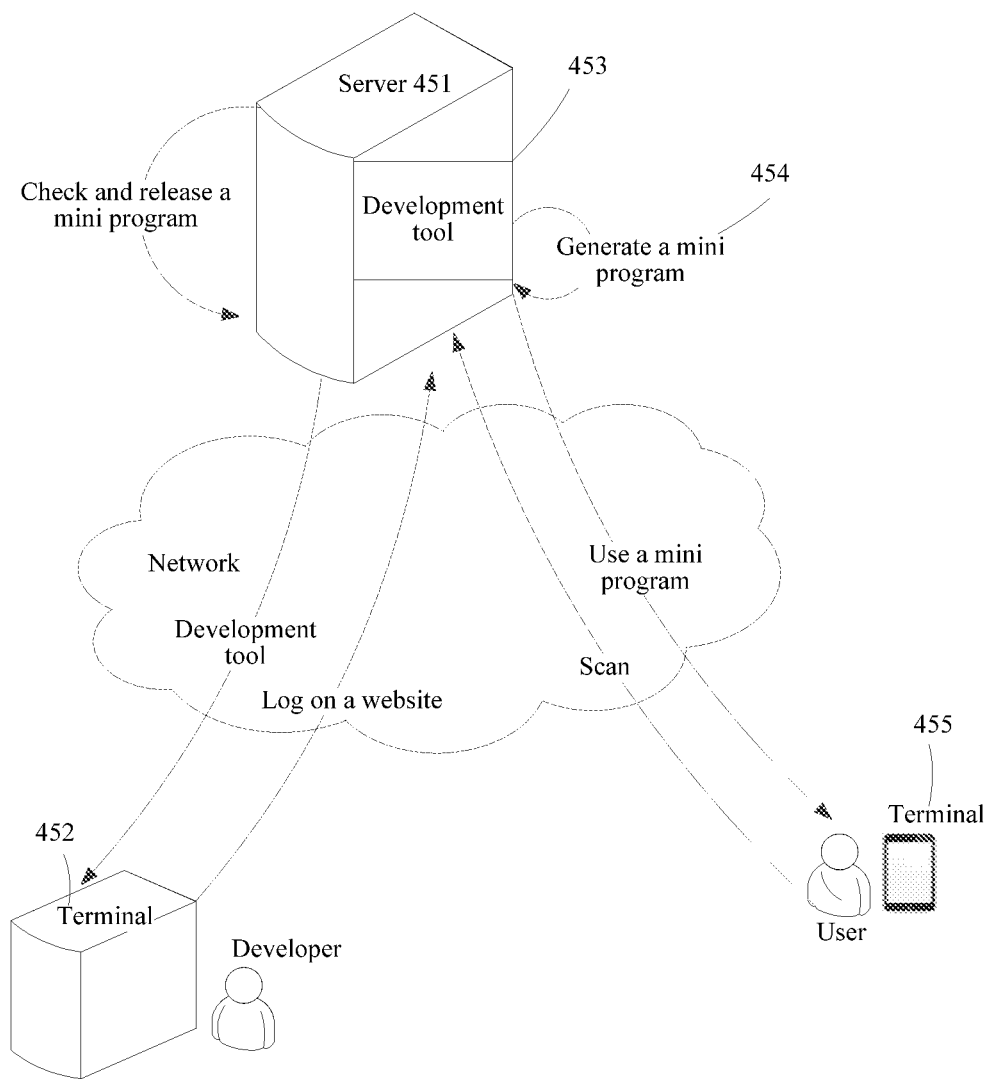
FIG. 4E is a schematic diagram of applying an application development tool according to an embodiment of the present application.

In an application process, as shown in FIG. 4E, the technical solutions provided in this embodiment of the present application may be embodied in a form of a development tool. The development tool may be released on a computing device 451 (the computing device is used as a server). An engineer who intends to develop a mini program logs on a release website of a development tool on a terminal 452 of the engineer, and then downloads the development tool from the server, or directly runs the development tool 453 on the web page, so that the development tool generates a mini program as described in the foregoing embodiment. The generated mini program may be released after being checked, and a released mini program 454 may reach a user side, so that a user terminal 455 may use the mini program through scanning or searching.

Herein, in a process of a specific embodiment, the computing device or terminal may be various types of electronic devices having an information processing capability. For example, the electronic device may include a mobile phone, a tablet computer, a desktop computer, a personal digital assistant, or the like.

The embodiments of the present application provide an application development tool. Parts included in the application development tool and subparts included in the parts may be implemented by using a processor in a computing device such as a computer, a server, or a personal computer, or certainly may be implemented by using a logical circuit. In the process of the embodiments, the processor may be a central processing unit (CPU), a microprocessor (MPU), a digital signal processor (DSP), or a field programmable gate array (FPGA).

Figure 5:
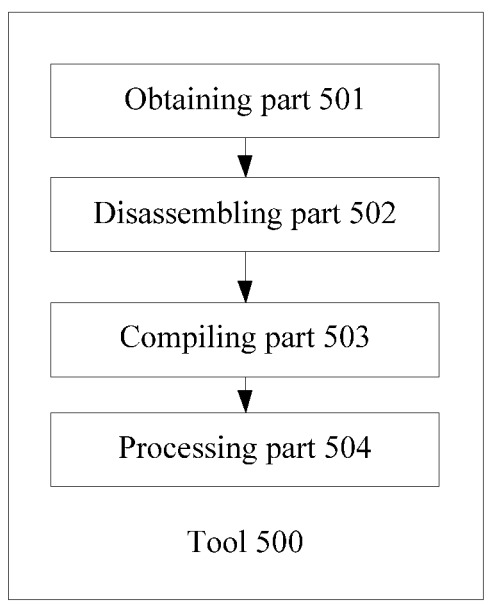
FIG. 5 is a schematic diagram of a composition structure of an application development tool according to an embodiment of the present application.

FIG. 5 is a schematic diagram of a composition structure of an application development tool according to an embodiment of the present application. As shown in FIG. 5, the tool 500 includes an obtaining part 501, a disassembling part 502, a compiling part 503, and a processing part 504.

The obtaining part 501 is configured to obtain an input file in a predetermined format, the input file including content code of each part used for forming a mini program.

The disassembling part 502 is configured to disassemble the content code of each part in the input file into different category code according to corresponding preset categories.

The compiling part 503 is configured to invoke a corresponding compiler according to an attribute of each piece of the category code, to compile the category code, to correspondingly obtain a description file of each piece of the category code.

The processing part 504 is configured to perform plug-in processing on the description file of the category code of each part, to obtain the mini program.

In another embodiment of the present application, the input file at least includes content code of an application part and content code of a page part, and the disassembling part is configured to at least disassemble the content code of the application part into script code; and at least disassemble content code of each page in the page part into style code, page element code, and script code.

In another embodiment of the present application, the compiling part is configured to invoke compilers respectively corresponding to the style code, the page element code, and the script code, to correspondingly compile the style code, the page element code, and the script code of each page respectively, to correspondingly obtain a style sheet file, a page structure file, and a logical file of each page.

In another embodiment of the present application, the obtaining part includes a retrieving subpart, a loading subpart, and a conversion subpart.

The retrieving subpart is configured to retrieve content code from a resource library according to a determined keyword.

The loading subpart is configured to at least load the retrieved content code.

The conversion subpart is configured to perform format conversion on the content code according to a preset format, to obtain the input file in the predetermined format.

In another embodiment of the present application, the tool further includes an analyzing part, a determining part, and a modification part.

The analyzing part is configured to analyze the content code of each part in the input file, to obtain association information between components in each part.

The determining part is configured to determine path information of the components in each part.

The modification part is configured to modify path information in the input file according to the association information between the components in each part and the path information of the components in each part.

Correspondingly, the disassembling part is configured to disassemble content code of each part in the modified input file into different category code according to the corresponding preset categories.

In another embodiment of the present application, the resource library includes three types of base class resources: base class components, base class pages, and base class applications, the base class components are isolated from each other, and the base class pages inherit from the components.

The retrieving content code from a resource library according to a determined keyword, and at least loading the retrieved content code includes:

the retrieving subpart being configured to retrieve a base class component, a base class page, and a base class application from the resource library according to the determined keyword;

the loading subpart being configured to at least load the retrieved base class component, base class page, and base class application; and the conversion subpart being configured to recombine the retrieved base class component into a user-defined component, recombine the retrieved base class page and a user component into a user-defined page, and recombine the retrieved base class application and the user-defined page into a user-defined application; and perform format conversion respectively on the user-defined component, the user-defined page, and the user-defined application according to the preset format, to obtain the input file in the predetermined format.

It should be noted that the description of the foregoing development tool embodiment is similar to the description of the foregoing method embodiment, and has beneficial effects similar with those in the method embodiment. For technical details that are not disclosed in the development tool embodiment of the present application, refer to the description of the method embodiment of the present disclosure for understanding.

Figure 6:
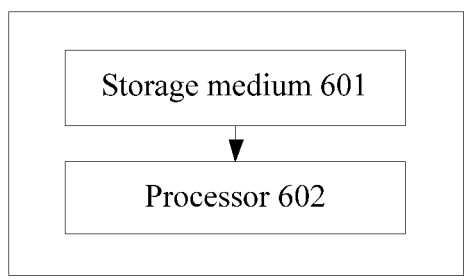
FIG. 6 is a schematic diagram of a composition structure of an application development device according to an embodiment of the present application.

The embodiments of the present application provide a mini program development device. FIG. 6 is a schematic diagram of a composition structure of an application development device according to an embodiment of the present application. As shown in FIG. 6, the application development device includes a storage medium 601 and a processor 602.

The storage medium 601 is configured to store computer executable instructions.

The processor 602 is configured to execute the stored computer executable instructions. The computer executable instructions include:

obtaining an input file in a predetermined format, the input file including content code of each part used for forming a mini program;

disassembling the content code of each part in the input file into different category code according to corresponding preset categories;

invoking a corresponding compiler according to an attribute of each piece of the category code, to compile the category code, to correspondingly obtain a description file of each piece of the category code; and performing plug-in processing on the description file of the category code of each part, to obtain the mini program.

The embodiments of the present application provide a computer readable storage medium, storing a computer program. The computer program, when being executed by a processor, implements the steps in the foregoing application development method.

The embodiments of the present application provide an application development method. The method is performed by a computing device. The computing device includes one or more processors and a storage medium, and one or more programs. The one or more programs are stored in the storage medium. The program includes one or more units each corresponding to a set of instructions. The one or more processors are configured to execute the instructions. The method includes:

obtaining an input file in a predetermined format, the input file including content code of each part used for forming an application;

disassembling the content code of each part in the input file into different category code according to corresponding preset categories;

invoking a corresponding compiler according to an attribute of each piece of the category code, to compile the category code, to correspondingly obtain a description file of each piece of the category code; and performing plug-in processing on the description file of the category code of each part, to obtain the application.

Figure 7:
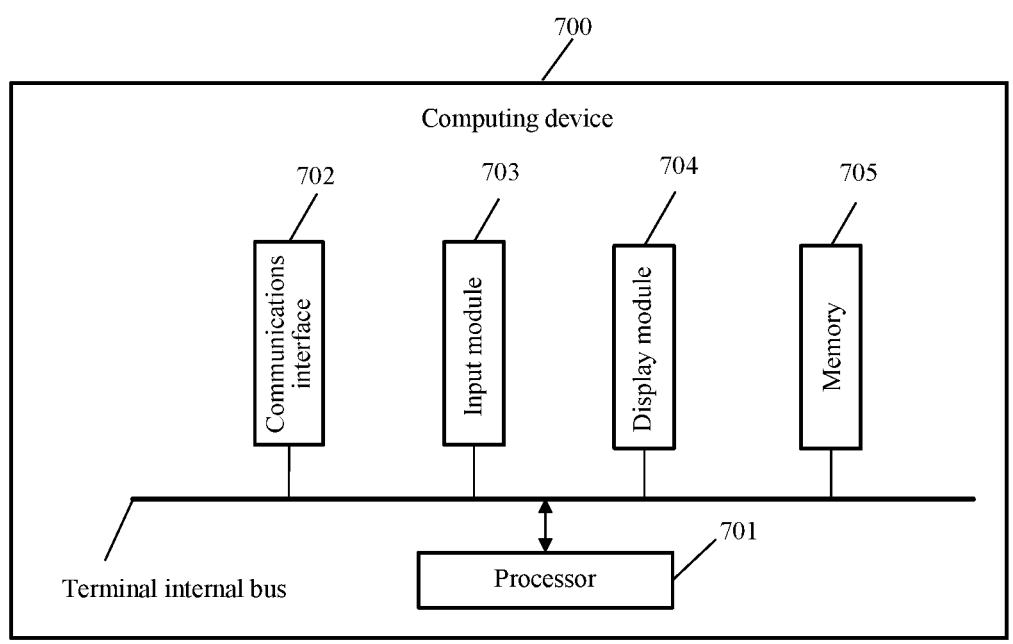
FIG. 7 is a schematic diagram of a hardware entity of a computing device according to an embodiment of the present application.

In an implementation process, the mini program development device may be implemented by using a computing device such as a computer, a server, or a personal computer. FIG. 7 is a schematic diagram of a hardware entity of a computing device according to an embodiment of the present application. As shown in FIG. 7, the hardware entity of the computing device 700 includes: a processor 701, a communications interface 702, an input module 703, a display module 704, and a memory 705.

The processor 701 usually controls overall operations of the computing device 700. For example, the input module 703 may be implemented as a touchscreen, to output user operation data representing an operation characteristic (including a contact position, a quantity of contacts, and trigger pressure) of the touch screen to the processor 701. The processor 701 may parse the user operation data to determine a function triggered by a user on a display interface, and generate display data corresponding to the triggered function, for the display module 704 to load a page corresponding to the triggered function.

The communications interface 702 may enable the computing device to communicate with other terminals or servers through a network.

The input module 703 may be configured to receive input character information, and generate a signal input related with user settings and function control. The input module may include a touch control surface. The touch control surface may collect a touch operation of a user on or near the touch control surface (such as an operation of a user on or near the touch control surface by using any suitable object or accessory, such as a finger or a stylus), obtain a signal brought by the touch operation, convert the signal into contact coordinates, and then send the contact coordinates to the processor 701 for processing, and can receive and execute a command sent by the processor 701.

The display module 704 may be configured to display the functions implemented by the processor 701 and related information.

The memory 705 is configured to store instructions and applications that may be executed by the processor 701, may further buffer data (for example, image data, audio data, voice communication data, and video communication data) to be processed or already processed by the processor 701 and the modules in the computing device 700, and may be implemented by using a flash memory (FLASH) or a random access memory (RAM) 705.

It should be noted that the description of the foregoing computing device embodiment is similar to the description of the foregoing method embodiment, and has beneficial effects same as those in the method embodiment. For the technical details that are not disclosed in the computing device embodiment of the present application, refer to the description of the method embodiment of the present application by a person skilled in the art for understanding.

It should be noted that, implementations and operations of the subject described in the specification can be implemented by a digital electronic circuit or computer software, firmware, or hardware, and include structures disclosed in the specification and structural equivalence thereof, or use a combination of one or more of the structures and the structural equivalence thereof. The implementations of the subject described in the specification can be implemented as one or more computer programs, namely, one or more computer program instruction modules, which are coded to one or more computer storage media to be executed by a data processing apparatus or control operations of the data processing apparatus. Alternatively or additionally, computer instructions can be coded to a transmission signal (for example, an electrical signal, an optical signal, or an electromagnetic signal generated by a machine) generated manually, and the signal is generated for coding information to send the information to a suitable receiver apparatus for execution by the data processing apparatus. The computer storage medium can be or include a computer readable storage device, a computer readable storage carrier, a random or sequential access storage array or device, or a combination of one or more of the foregoing items. In addition, although the computer storage medium is not a transmission signal, the computer storage medium can be a source or target of computer program instructions coded in the transmission signal generated manually. The computer storage medium can further be or be included in one or more independent components or media (for example, a plurality of CDs, magnetic disks, or other storage devices). Therefore, the computer storage medium may be tangible.

The operations described in the specification can be implemented as operations performed by the data processing apparatus on data stored on one or more computer readable storage devices or received from other source.

The computer program (also referred to as a program, software, a software application, a script, or code) can be written in any programming language form (including an assembly language or an interpretive language, and a declarative language or a program language), and can be deployed in any form (including being used as an independent program, or used as a module, a component, a subprogram, an object, or other units applicable to a computing environment). The computer program may but unnecessarily correspond to a file in a file system. The program can be stored in a part of the file for saving other programs or data (for example, stored in one or more scripts in a markup language document), in a single file specifically used for the program of interest, or in a plurality of collaborative files (for example, files storing one or more modules, a submodule, or a code part). The computer program can be deployed on one or more computers for execution. The one or more computers are located at one site, or distributed in a plurality of sites and interconnected through a communications network.

The processes and logical flows described in the specification can be executed by one or more programmable processors, and the one or more programmable processors execute one or more computer programs to execute actions by operating input data and generating an output. The foregoing processes and logical flows can alternatively be executed by a dedicated logical circuit, and the apparatus can be further implemented as a dedicated logical circuit, for example, an FPGA or an ASIC.

The processor suitable for executing the computer program includes, for example, a general purpose MPU and a dedicated MPU, and any one or more processors of any digital computer type. Usually, the processor receives instructions and data from a read only memory or a RAM or both of them. Main elements of the computer are processors for executing actions according to the instructions and one or more memories for storing the instructions and data. Usually, the computer further includes one or more mass storage devices (for example, a magnetic disk, a magnetic optical disk, or an optical disk) for storing data, or is operably coupled to one or more mass storage devices to receive data from or send data to the one or more mass storage devices, or both. However, the computer does not need to have such devices. In addition, the computer can be embedded in another device, for example, a mobile phone, a personal digital assistant (PDA), a mobile audio player, a mobile video player, a game console, a GPS receiver, or a portable storage device (for example, a universal serial bus (USB) flash disk). The foregoing is merely for example. The device suitable for storing computer program instructions and data includes all forms of nonvolatile memories, media, and storage devices, for example, a semiconductor storage device (for example, an EPROM, an EEPROM, and a FLASH device), a magnetic disk (for example, an internal hard disk or a removable hard disk), a magnetic optical disk, a CD-ROM, and a DVD-ROM disk. The processor and the memory can be supplemented by a dedicated logical circuit or included in a dedicated logical circuit.

Although the specification includes many specific implementation details, the implementation details should not be explained as a limitation to the scope of any claim, but are descriptions of features specifically for particular implementations. The particular features described in the context of the independent implementations in the specification can also be implemented in a combination of single implementations. On the contrary, the features described in the context of the single implementations can also be independently implemented in a plurality of implementations or implemented in any suitable subcombination. In addition, although the features may be described to be in particular combinations or even as initially required effects in the foregoing, in some cases, one or more features in the required combinations can be removed from the combinations, and the required combinations may be subcombinations or variations of subcombinations.

Similarly, although the operations are shown in particular orders in the accompanying drawings, it should not be understood that the operations are required to be executed in the shown particular orders or sequential orders, or all the shown operations are executed to achieve the expected results. In a particular environment, multitask processing and parallel processing may be advantageous. In addition, the separation of the system components in the foregoing implementations should not be understood as that the separation is required to be implemented in all implementations, and it should be understood that the described program components and systems can usually be jointly integrated in a single software product or packaged as a plurality of software products.

Therefore, particular implementations of the subject have been described. Other implementations are in the scope of the following claims. In some cases, the actions limited in the claims can be executed in different orders and can still achieve the expected result. In addition, the processes described in the accompanying drawings are unnecessarily in the shown particular orders or sequential orders to achieve the expected result. In a particular implementation, multitask processing or parallel processing may be used.

INDUSTRIAL PRACTICABILITY

In the embodiments of the present application, an input file in a predetermined format is first obtained, the input file including content code of each part used for forming an application; the content code of each part in the input file is then disassembled into different category code according to corresponding preset categories; a corresponding compiler is then invoked according to an attribute of each piece of the category code, to compile the category code, to correspondingly obtain a description file of each piece of the category code; and plug-in processing is finally performed on the description file of the category code of each part, to obtain the application. In this way, the time-consuming and effort-consuming problem of the current application development can be resolved, thereby developing applications rapidly and conveniently.

What is claimed is:

1. An application development method performed at a computing device having one or more processors and memory storing a plurality of operations to be executed by the one or more processors, the method comprising:
   obtaining an input file in a predetermined format, the input file comprising content code of each part used for forming an application;
   disassembling the content code of each part in the input file into different category code according to corresponding categories;
   invoking a corresponding compiler according to an attribute of each piece of the category code, to compile the category code, to correspondingly obtain a description file of each piece of the category code; and
   performing plug-in processing on the description file of the category code of each part, to obtain the application.

2. The method according to claim 1, wherein the input file at least comprises content code of an application part and content code of a page part, and the disassembling the content code of each part in the input file into different category code according to corresponding categories comprises:
   at least disassembling the content code of the application part into script code; and
   at least disassembling content code of each page in the page part into style code, page element code, and script code.

3. The method according to claim 2, the invoking a corresponding compiler according to an attribute of each piece of the category code, to compile the category code, to correspondingly generate a description file of each piece of the category code comprises:
   invoking compilers respectively corresponding to the style code, the page element code, and the script code, to correspondingly compile the style code, the page element code, and the script code of each page respectively, to correspondingly obtain a style sheet file, a page structure file, and a logical file of each page.

4. The method according to claim 1, the obtaining an input file in a predetermined format comprises:
   retrieving content code from a resource library according to a determined keyword, and at least loading the retrieved content code;
   performing format conversion on the content code according to a format, to obtain the input file in the predetermined format.

5. The method according to claim 1, further comprising:
   analyzing the content code of each part in the input file, to obtain association information between components in each part;
   determining path information of the components in each part;
   modifying path information in the input file according to the association information between the components in each part and the path information of the components in each part; and
   disassembling content code of each part in the modified input file into different category code according to the corresponding categories.

6. The method according to claim 5, wherein the resource library comprises three types of base class resources: base class components, base class pages, and base class applications, the base class components are isolated from each other, and the base class pages inherit from the components;
   the retrieving content code from a resource library according to a determined keyword, and at least loading the retrieved content code comprises: retrieving a base class component, a base class page, and a base class application from the resource library according to the determined keyword; and at least loading the retrieved base class component, base class page, and base class application; and
   the performing format conversion on the content code according to a format, to obtain the input file in the predetermined format comprises: recombining the retrieved base class component into a user-defined component, recombining the retrieved base class page and a user component into a user-defined page, and recombining the retrieved base class application and the user-defined page into a user-defined application; and performing format conversion respectively on the user-defined component, the user-defined page, and the user-defined application according to the format, to obtain the input file in the predetermined format.

7. A computing device, comprising one or more processors, memory coupled to the one or more processors, and a plurality of programs stored in the memory that, when executed by the one or more processors, cause the computing device to perform a plurality of operations including:

obtaining an input file in a predetermined format, the input file comprising content code of each part used for forming an application;

disassembling the content code of each part in the input file into different category code according to corresponding categories;

invoking a corresponding compiler according to an attribute of each piece of the category code, to compile the category code, to correspondingly obtain a description file of each piece of the category code; and performing plug-in processing on the description file of the category code of each part, to obtain the application.

8. The computing device according to claim 7, wherein the input file at least comprises content code of an application part and content code of a page part, and the disassembling the content code of each part in the input file into different category code according to corresponding categories comprises:

at least disassembling the content code of the application part into script code; and at least disassembling content code of each page in the page part into style code, page element code, and script code.

9. The computing device according to claim 8, the operation of invoking a corresponding compiler according to an attribute of each piece of the category code, to compile the category code, to correspondingly generate a description file of each piece of the category code comprises:

invoking compilers respectively corresponding to the style code, the page element code, and the script code, to correspondingly compile the style code, the page element code, and the script code of each page respectively, to correspondingly obtain a style sheet file, a page structure file, and a logical file of each page.

10. The computing device according to claim 7, the operation of obtaining an input file in a predetermined format comprises:

retrieving content code from a resource library according to a determined keyword, and at least loading the retrieved content code;

performing format conversion on the content code according to a format, to obtain the input file in the predetermined format.

11. The computing device according to claim 7, wherein plurality of operations further comprise:

analyzing the content code of each part in the input file, to obtain association information between components in each part;

determining path information of the components in each part;

modifying path information in the input file according to the association information between the components in each part and the path information of the components in each part; and disassembling content code of each part in the modified input file into different category code according to the corresponding categories.

12. The computing device according to claim 11, wherein the resource library comprises three types of base class resources: base class components, base class pages, and base class applications, the base class components are isolated from each other, and the base class pages inherit from the components;

the retrieving content code from a resource library according to a determined keyword, and at least loading the retrieved content code comprises: retrieving a base class component, a base class page, and a base class application from the resource library according to the determined keyword; and at least loading the retrieved base class component, base class page, and base class application; and the performing format conversion on the content code according to a format, to obtain the input file in the predetermined format comprises: recombining the retrieved base class component into a user-defined component, recombining the retrieved base class page and a user component into a user-defined page, and recombining the retrieved base class application and the user-defined page into a user-defined application; and performing format conversion respectively on the user-defined component, the user-defined page, and the user-defined application according to the format, to obtain the input file in the predetermined format.

13. A non-transitory computer readable storage medium storing a plurality of machine readable instructions in connection with a server having one or more processors, wherein the plurality of machine readable instructions, when executed by the one or more processors, cause the server to perform a plurality of operations including:

obtaining an input file in a predetermined format, the input file comprising content code of each part used for forming an application;

disassembling the content code of each part in the input file into different category code according to corresponding categories;

invoking a corresponding compiler according to an attribute of each piece of the category code, to compile the category code, to correspondingly obtain a description file of each piece of the category code; and performing plug-in processing on the description file of the category code of each part, to obtain the application.

14. The non-transitory computer readable storage medium according to claim 13, wherein the input file at least comprises content code of an application part and content code of a page part, and the disassembling the content code of each part in the input file into different category code according to corresponding categories comprises:

at least disassembling the content code of the application part into script code; and at least disassembling content code of each page in the page part into style code, page element code, and script code.

15. The non-transitory computer readable storage medium according to claim 14, the operation of invoking a corresponding compiler according to an attribute of each piece of the category code, to compile the category code, to correspondingly generate a description file of each piece of the category code comprises:

invoking compilers respectively corresponding to the style code, the page element code, and the script code, to correspondingly compile the style code, the page element code, and the script code of each page respectively, to correspondingly obtain a style sheet file, a page structure file, and a logical file of each page.

16. The non-transitory computer readable storage medium according to claim 13, the operation of obtaining an input file in a predetermined format comprises:

retrieving content code from a resource library according to a determined keyword, and at least loading the retrieved content code;

performing format conversion on the content code according to a format, to obtain the input file in the predetermined format.

17. The non-transitory computer readable storage medium according to claim 13, wherein plurality of operations further comprise:

analyzing the content code of each part in the input file, to obtain association information between components in each part;

determining path information of the components in each part;

modifying path information in the input file according to the association information between the components in each part and the path information of the components in each part; and disassembling content code of each part in the modified input file into different category code according to the corresponding categories.

18. The non-transitory computer readable storage medium according to claim 17, wherein the resource library comprises three types of base class resources: base class components, base class pages, and base class applications, the base class components are isolated from each other, and the base class pages inherit from the components;

the retrieving content code from a resource library according to a determined keyword, and at least loading the retrieved content code comprises: retrieving a base class component, a base class page, and a base class application from the resource library according to the determined keyword; and at least loading the retrieved base class component, base class page, and base class application; and the performing format conversion on the content code according to a format, to obtain the input file in the predetermined format comprises: recombining the retrieved base class component into a user-defined component, recombining the retrieved base class page and a user component into a user-defined page, and recombining the retrieved base class application and the user-defined page into a user-defined application; and performing format conversion respectively on the user-defined component, the user-defined page, and the user-defined application according to the format, to obtain the input file in the predetermined format.

\* \* \* \* \*